(12) United States Patent
Kotlar

(10) Patent No.: US 12,358,492 B2
(45) Date of Patent: Jul. 15, 2025

(54) CONTROL DEVICE AND A METHOD FOR CONTROLLING COMPONENTS OF A DRIVETRAIN SYSTEM OF A VEHICLE

(71) Applicant: Vitesco Technologies GmbH, Regensburg (DE)

(72) Inventor: Aurelian Kotlar, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 626 days.

(21) Appl. No.: 17/691,664

(22) Filed: Mar. 10, 2022

(65) Prior Publication Data

US 2022/0289168 A1    Sep. 15, 2022

(51) Int. Cl.
*B60W 20/00*        (2016.01)
*B60W 10/02*        (2006.01)
(Continued)

(52) U.S. Cl.
CPC ............ *B60W 20/13* (2016.01); *B60W 10/02* (2013.01); *B60W 10/06* (2013.01); *B60W 10/08* (2013.01);
(Continued)

(58) Field of Classification Search
CPC ...... B60W 20/13; B60W 10/02; B60W 10/06; B60W 10/08; B60W 10/26; B60W 30/192;
(Continued)

(56) References Cited

U.S. PATENT DOCUMENTS

| H1113 H | * | 12/1992 | Yoshizaki | ............. F01N 3/2013 60/299 |
|---|---|---|---|---|
| 5,321,231 A | | 6/1994 | Schmalzriedt | ................ 219/497 |

(Continued)

FOREIGN PATENT DOCUMENTS

| DE | 10 2009 003784 | 10/2010 |
|---|---|---|
| DE | 10 2011 104193 | 12/2012 |

(Continued)

OTHER PUBLICATIONS

Search Report for EP Application No. 21465510.2, 7 pages, Aug. 24, 2021.

(Continued)

*Primary Examiner* — Vivek D Koppikar
(74) *Attorney, Agent, or Firm* — Slayden Grubert Beard PLLC

(57) ABSTRACT

The teachings of the present disclosure may include operation of a drivetrain system for a vehicle with multiple operation modes. The first includes coupling the AC electric machine with the internal combustion engine for starting the internal combustion engine or for supplying an additional torque. The second includes coupling the internal combustion engine with the AC electric machine for charging the electric battery. The third includes decoupling the AC electric machine from the internal combustion engine and connecting an AC winding to a heating resistance of a catalyst device for electrically heating the catalyst device. The fourth includes coupling the internal combustion engine with the AC electric machine to the heating resistance for electrically heating the catalyst device.

9 Claims, 3 Drawing Sheets

(51) Int. Cl.
- *B60W 10/06* (2006.01)
- *B60W 10/08* (2006.01)
- *B60W 10/26* (2006.01)
- *B60W 20/13* (2016.01)
- *B60W 30/192* (2012.01)
- *F01N 3/20* (2006.01)
- *H02M 7/537* (2006.01)
- *B60K 6/26* (2007.10)
- *B60K 6/40* (2007.10)

(52) U.S. Cl.
CPC .......... *B60W 10/26* (2013.01); *B60W 30/192* (2013.01); *F01N 3/2013* (2013.01); *H02M 7/537* (2013.01); *B60K 6/26* (2013.01); *B60K 2006/268* (2013.01); *B60K 6/40* (2013.01); *B60W 2710/021* (2013.01); *B60W 2710/0694* (2013.01); *B60W 2710/08* (2013.01); *B60Y 2200/92* (2013.01); *B60Y 2300/91* (2013.01); *B60Y 2400/604* (2013.01); *B60Y 2400/61* (2013.01)

(58) Field of Classification Search
CPC ... B60W 2710/021; B60W 2710/0694; B60W 2710/08; B60W 20/40; B60W 20/16; B60W 2510/02; H02M 7/537; B60K 6/26; B60K 6/40; B60K 6/28; B60K 6/38; B60Y 2200/92; B60Y 2300/91; B60Y 2400/604; H02K 7/108; H02P 25/18; H02P 27/08; F01N 2240/16; G05B 19/4183; G05B 19/4185; G05B 23/024; G05B 23/0289

See application file for complete search history.

(56) References Cited

U.S. PATENT DOCUMENTS

| | | | | |
|---|---|---|---|---|
| 5,345,154 A | * | 9/1994 | King | B60W 10/06 318/803 |
| 5,390,493 A | | 2/1995 | Fujishita | 60/284 |
| 5,512,789 A | * | 4/1996 | Lyon | F01N 9/00 219/205 |
| 5,645,745 A | * | 7/1997 | Hartwick | F01N 9/00 219/205 |
| 5,754,032 A | * | 5/1998 | Aoki | H02J 7/1438 322/8 |
| 5,757,164 A | * | 5/1998 | Yoshizaki | H01M 10/46 60/284 |
| 5,841,266 A | * | 11/1998 | Hikita | H02J 13/00007 322/8 |
| 5,966,931 A | * | 10/1999 | Yoshizaki | F01N 13/009 60/284 |
| 5,994,787 A | * | 11/1999 | Hibino | H02J 7/1438 219/205 |
| 6,003,304 A | * | 12/1999 | Swanson | F01N 11/00 219/508 |
| 6,202,615 B1 | * | 3/2001 | Pels | F02N 19/04 307/10.6 |
| 8,141,534 B2 | | 3/2012 | Liu | 123/179.4 |
| 8,143,856 B2 | | 3/2012 | Andrea | 320/137 |
| 8,808,124 B2 | | 8/2014 | Major | 180/65.22 |
| 9,153,996 B2 | | 10/2015 | de Sousa et al. | 320/109 |
| 9,919,702 B1 | * | 3/2018 | Wang | B60W 20/40 |
| 2002/0123401 A1 | | 9/2002 | Henry | 474/101 |
| 2003/0224903 A1 | * | 12/2003 | Kitamura | F02B 67/06 477/5 |
| 2004/0062059 A1 | | 4/2004 | Cheng | 363/17 |
| 2011/0006710 A1 | * | 1/2011 | Kondo | H02P 6/14 318/400.03 |
| 2011/0307132 A1 | | 12/2011 | Hashimoto | 701/22 |
| 2012/0286740 A1 | | 11/2012 | Loudot | 320/137 |
| 2014/0000245 A1 | * | 1/2014 | Harada | F01N 3/2026 60/286 |
| 2014/0001854 A1 | * | 1/2014 | Motegi | B60L 55/00 307/38 |
| 2014/0112850 A1 | | 4/2014 | Hodgson | F01N 3/2889 |
| 2014/0210384 A1 | * | 7/2014 | Koyama | B60L 1/02 318/376 |
| 2014/0265332 A1 | * | 9/2014 | Jaros | F02N 15/04 290/48 |
| 2016/0065107 A1 | | 3/2016 | Klein | H02P 9/08 |
| 2017/0297555 A1 | * | 10/2017 | Jeong | B60W 10/08 |
| 2018/0111605 A1 | * | 4/2018 | Yun | B60W 50/14 |
| 2018/0269776 A1 | | 9/2018 | Zhu | H02M 1/14 |
| 2018/0278168 A1 | * | 9/2018 | Brown | H02P 27/06 |
| 2019/0118794 A1 | * | 4/2019 | Slottskog | B60W 10/06 |
| 2019/0126763 A1 | * | 5/2019 | Najmabadi | B60L 53/24 |
| 2019/0126910 A1 | * | 5/2019 | Kim | B60W 20/16 |
| 2019/0153935 A1 | * | 5/2019 | Richards | F02B 67/06 |
| 2020/0122585 A1 | * | 4/2020 | Bhat | G05B 19/0426 |
| 2020/0361447 A1 | | 11/2020 | Kim | B60W 20/40 |
| 2023/0009497 A1 | * | 1/2023 | Freitag | H02P 6/15 |

FOREIGN PATENT DOCUMENTS

| | | | |
|---|---|---|---|
| DE | 10 2016 217370 | 3/2018 | |
| JP | 2009274478 A | 11/2009 | ............ B60K 6/445 |

OTHER PUBLICATIONS https://www.continental-automotive.com/en-gl/Passenger-Cars/Powertrain/Electrification/48-Volt-Mild-Hybrid/48-Volt-belt-driven-starter-generator.

https://www.continental-automotive.com/en-gl/Passenger-Cars/Powertrain/Electrification/48-Volt-Mild-Hybrid/48-Volt-DC-DC-Converter.

Takahashi et al., Auxiliry Inverter Charger (AIC), https://www.denso.com/jp/ja/innovation/technology/dtr/v22/paper-05.pdf, May 2014.

Korean Notice of Allowance, Application No. 2024059321484, 3 pages.

Chinese Office Action, Application No. 202210237013.5, 25 pages, Jan. 3, 2025.

\* cited by examiner

CONTROL DEVICE AND A METHOD FOR CONTROLLING COMPONENTS OF A DRIVETRAIN SYSTEM OF A VEHICLE

CROSS-REFERENCE TO RELATED APPLICATIONS

This application claims priority to EP Application No. 21465510 filed Mar. 12, 2021, the contents of which are hereby incorporated by reference in their entirety.

TECHNICAL FIELD

The present disclosure relates to motor vehicles. Various embodiments of the teachings herein may include control devices and/or methods for controlling components of a drivetrain system of a vehicle.

BACKGROUND

In the prior art, such a control device and such a control method are provided for vehicles having a hybrid drivetrain comprising an internal combustion engine and a multi-phase (e.g., three-phase) AC electric machine. In such a vehicle, it may be foreseen that each of the internal combustion engine and the AC electric machine when operated can supply a contribution to a driving torque for driving the vehicle. In particular, the known control device is provided for controlling at least the following components of the vehicle's drivetrain system:
- a first switch device for connecting an electric battery of the vehicle to a DC electrical system of the vehicle, and disconnecting the electric battery from the DC electrical system, respectively,
- a bidirectional converter for enabling electric current to flow from the DC electrical system in alternating fashion, for example in PWM fashion, to each one of a plurality of windings of a multi-phase AC electric machine of the vehicle, for driving the AC electric machine, and enabling electric current to flow in alternating fashion from each one of the plurality of windings to the DC electrical system, for recovering electric energy from the AC electric machine, respectively, and
- a clutch for coupling the AC electric machine with an internal combustion engine of the vehicle, and decoupling the AC electric machine from the internal combustion engine, respectively.

Furthermore, the control device is designed to provide:
- a first operation mode of the components, in which the first switch device connects the electric battery to the DC electrical system, the converter causes electric current to flow from the DC electrical system in alternating fashion to each one of the plurality of windings, and the clutch couples the AC electric machine with the internal combustion engine, for starting the internal combustion engine or for supplying an additional torque in the drivetrain system, and/or
- a second operation mode of the components, in which the internal combustion engine is running, the clutch couples the internal combustion engine with the AC electric machine, the converter causes electric current to flow in alternating fashion from each one of the plurality of windings to the DC electrical system, and the first switch device connects the DC electrical system to the electric battery, for charging the electric battery.

In the prior art, internal combustion engines often are equipped with a catalyst in an exhaust passage to reduce the emissions by helping the unburned components of the exhaust gases to oxidize. The catalyst operates at elevated temperatures, typically above 250° C. To reach such a high temperature, the catalyst comprises a resistive heater (heating resistance) to heat up the catalyst to the required temperature quicker ("EHC": electrically heated catalyst). This is especially useful for hybrid and mild hybrid vehicles, where the internal combustion engine operates intermittently.

The electrical power required to heat up the catalyst when starting the internal combustion engine is typically in the range of several kilowatts. Typically, the electrical power can be reduced a few minutes after the engine is started and then further reduced to zero, unless the vehicle is operated in a climatically cold region where it may be necessary to supply electrical power to heat the catalyst until the engine is switched off.

In the prior art of vehicles having a hybrid drivetrain and an electrically heatable catalyst device in an exhaust passage of the internal combustion engine as mentioned above, there exist several approaches to accomplish the necessary electric supply for the heatable catalyst device.

One approach is to supply the heating resistance of the catalyst device in controlled manner with an electric current from a typically used 12V or 24V DC electrical system of the vehicle. This, however, requires relatively high electrical currents (approx. 100 A or more) to be supplied to the heating resistance which in turn requires a wiring to the heating resistance that demands a considerable volume of installation space and is expensive. In addition, the means required to control the electrical voltage and/or current to power the heatable catalyst device increases the cost.

Another approach would be to provide a DC/DC converter for upconverting a voltage of the respective DC electrical system (e.g. 12V or 24V) for the supply of the heating resistance of the catalyst device. This, however, causes additional cost, weight and required volume of installation space due to the provision of the additional DC/DC converter.

SUMMARY

The teachings of the present disclosure may avoid the problems mentioned above and to provide an electrical power supply for the heating resistance of an electrically heatable catalyst device in a vehicle having a hybrid drivetrain as mentioned above. For example, some embodiments include a control device (10) for controlling components (20, 30, 40, 50) of a drivetrain system (1) of a vehicle, said components (20, 30, 40, 50) comprising: a first switch device (20) for connecting an electric battery (B) of the vehicle to a DC electrical system (6) of the vehicle, and disconnecting the electric battery (B) from the DC electrical system (6), respectively, a bidirectional converter (30) for enabling electric current to flow from the DC electrical system (6) in alternating fashion, for example in PWM fashion, to each one of a plurality of windings (W1, W2, W3) of a multi-phase AC electric machine (2) of the vehicle, for driving the AC electric machine (2), and enabling electric current to flow in alternating fashion from each one of the plurality of windings (W1, W2, W3) to the DC electrical system (6), for recovering electric energy from the AC electric machine (2), respectively, and a clutch (40) for coupling the AC electric machine (2) with an internal combustion engine (3) of the vehicle, and decoupling the AC electric machine (2) from the internal combustion engine (3), respectively. The control device (10) is designed to provide: a first operation mode of the components (20, 30, 40, 50), in which the first switch device (20) connects the electric battery (B) to the DC electrical system (6), the converter (30) causes electric current to flow from the DC electrical system (6) in alternating fashion to each one of the plurality of windings (W1, W2, W3), and the clutch (40) couples the AC electric machine (2) with the internal combustion engine (3), for starting the internal combustion engine (3) or for supplying an additional torque in the drivetrain system (1), and/or a second operation mode of the components (20, 30, 40, 50), in which the internal combustion engine (3) is running, the clutch (40) couples the internal combustion engine (3) with the AC electric machine (2), the converter (30) causes electric current to flow in alternating fashion from each one of the plurality of windings (W1, W2, W3) to the DC electrical system (6), and the first switch device (20) connects the DC electrical system (6) to the electric battery (B), for charging the electric battery (B). The components (20, 30, 40, 50) further comprise: a second switch device (50) for connecting at least one of the windings (W1, W2, W3) of the AC electric machine (2) to a heating resistance (R) of an electrically heatable catalyst device (5) in an exhaust passage (4) of the internal combustion engine (3), and disconnecting the at least one of the windings (W1, W2, W3) from the heating resistance (R), respectively. The control device (10) is further designed to provide a third operation mode of the components (20, 30, 40, 50), in which the clutch (40) decouples the AC electric machine (2) from the internal combustion engine (3), the first switch device (20) connects the electric battery (B) to the DC electrical system (6), the converter (30) causes electric current to flow from the DC electrical system (6) to the at least one winding (W1, W2, W3) or in alternating fashion to each one of the plurality of windings (W1, W2, W3), wherein the second switch device (50) connects the respective winding (W1, W2, W3) to the heating resistance (R) of the catalyst device (5), for electrically heating the catalyst device (5), and/or a fourth operation mode of the components (20, 30, 40, 50), in which the internal combustion engine (3) is running, the clutch (40) couples the internal combustion engine (3) with the AC electric machine (2), the converter (30) causes electric current to flow in alternating fashion from each one of the plurality of windings (W1, W2, W3) via the second switch device (50) to the heating resistance (R) of the catalyst device (5), wherein the second switch device (50) connects the respective winding (W1, W2, W3) to the heating resistance (R) for electrically heating the catalyst device (5).

In some embodiments, the converter (30) comprises a plurality of half-bridges (30-1, 30-2, 30-3), each of the half-bridges (30-1, 30-2, 30-3) electrically powered by the DC electrical system (6) and being formed by a series connection of two controllable semiconductor switches, wherein the control device (10) is designed to effect a PWM control of the half-bridges (30-1, 30-2, 30-3) in the first operation mode and the third operation mode, so that a respective output voltage for driving the respective electric current is provided at a circuit node (N1, N2, N3) between the two semiconductor switches, wherein the PWM control for each of the half-bridges (30-1, 30-2, 30-3) is effected by a complementary switching on and off of the two respective semiconductor switches.

In some embodiments, the windings (W1, W2, W3) of the AC electric machine (2) are stator windings (W1, W2, W3), in particular three stator windings (W1, W2, W3) connected in a star configuration.

In some embodiments, the drivetrain system (1) of the vehicle is a hybrid drivetrain system (1) comprising the internal combustion engine (3) and the AC electric machine (2).

In some embodiments, a capacitor (C) is arranged at an electric path between the second switch device (50) and the heating resistance (R) of the catalyst device (5), in order to buffer a voltage applied at the heating resistance (R) in the third operation mode and the fourth operation mode.

As another example, some embodiments include a method for controlling components (20, 30, 40, 50) of a drivetrain system (1) of a vehicle, said components (20, 30, 40, 50) comprising: a first switch device (20) for connecting an electric battery (B) of the vehicle to a DC electrical system (6) of the vehicle, and disconnecting the electric battery (B) from the DC electrical system (6), respectively, a bidirectional converter (30) for enabling electric current to flow from the DC electrical system (6) in alternating fashion, and for example in PWM fashion, to each one of a plurality of windings (W1, W2, W3) of a multi-phase AC electric machine (2) of the vehicle, for driving the AC electric machine (2), and enabling electric current to flow in alternating fashion from each one of the plurality of windings (W1, W2, W3) to the DC electrical system (6), for recovering electric energy from the AC electric machine (2), respectively, and a clutch (40) for coupling the AC electric machine (2) with an internal combustion engine (3) of the vehicle, and decoupling the AC electric machine (2) from the internal combustion engine (3), respectively. The method is designed to provide: a first operation mode of the components (20, 30, 40, 50), in which the first switch device (20) connects the electric battery (B) to the DC electrical system (6), the converter (30) causes electric current to flow from the DC electrical system (6) in alternating fashion to each one of the plurality of windings (W1, W2, W3), and the clutch (40) couples the AC electric machine (2) with the internal combustion engine (3), for starting the internal combustion engine (3) or for supplying an additional torque in the drivetrain system (1), and/or a second operation mode of the components (20, 30, 40, 50), in which the internal combustion engine (3) is running, the clutch (40) couples the internal combustion engine (3) with the AC electric machine (2), the converter (30) causes electric current to flow in alternating fashion from each one of the plurality of windings (W1, W2, W3) to the DC electrical system (6), and the first switch device (20) connects the DC electrical system (6) to the electric battery (B), for charging the electric battery (B). The components (20, 30, 40, 50) further comprise a second switch device (50) for connecting at least one of the windings (W1, W2, W3) of the AC electric machine (2) to a heating resistance (R) of an electrically heatable catalyst device (5) in an exhaust passage (4) of the internal combustion engine (3), and disconnecting the at least one of the windings (W1, W2, W3) from the heating resistance (R), respectively. The method is further designed to provide: a third operation mode of the components (20, 30, 40, 50), in which the clutch (40) decouples the AC electric machine (2) from the internal combustion engine (3), the first switch device (20) connects the electric battery (B) to the DC electrical system (6), the converter (30) causes electric current to flow from the DC electrical system (6) to the at least one winding (W1, W2, W3) or in alternating fashion to each one of the plurality of windings (W1, W2, W3), wherein the second switch device (50) connects the respective winding (W1, W2, W3) to the heating resistance (R) of the catalyst device (5), for electrically heating the catalyst device (5), and/or a fourth operation mode of the components (20, 30, 40, 50), in which the internal combustion engine (3) is running, the clutch (40) couples the internal combustion engine (3) with the AC electric machine (2), the converter (30) causes electric current to flow in alternating fashion from each one of the plurality of windings (W1, W2, W3) via the second switch device (50) to the heating resistance (R) of the catalyst device (5), wherein the second switch device (50) connects the respective winding (W1, W2, W3) to the heating resistance (R) for electrically heating the catalyst device (5).

In some embodiments, in the third operation mode, the converter (30) causes the electric current to flow from the DC electrical system (6) in PWM fashion to the at least one winding (W1, W2, W3) or in PWM fashion to each one of the plurality of windings (W1, W2, W3), respectively.

In some embodiments, in the fourth operation mode, the first switch device (20) disconnects the electric battery (B) from the DC electrical system (6).

As another example, some embodiments include a drivetrain system (1) for a vehicle, comprising: a first switch device (20) for connecting an electric battery (B) of the vehicle to a DC electrical system (6) of the vehicle, and disconnecting the electric battery (B) from the DC electrical system (6), respectively, a bidirectional converter (30) for enabling electric current to flow from the DC electrical system (6) in alternating fashion, for example in PWM fashion, to each one of a plurality of windings (W1, W2, W3) of a multi-phase AC electric machine (2) of the vehicle, for driving the AC electric machine (2), and enabling electric current to flow in alternating fashion from each one of the plurality of windings (W1, W2, W3) to the DC electrical system (6), for recovering electric energy from the AC electric machine (2), respectively, a clutch (40) for coupling the AC electric machine (2) with an internal combustion engine (3) of the vehicle, and decoupling the AC electric machine (2) from the internal combustion engine (3), respectively, and a control device (10) for controlling the first switch device (20), the converter (30) and the clutch (40). The control device (10) is designed to provide: a first operation mode of the drivetrain system (1), in which the first switch device (20) connects the electric battery (B) to the DC electrical system (6), the converter (30) causes electric current to flow from the DC electrical system (6) in alternating fashion to each one of the plurality of windings (W1, W2, W3), and the clutch (40) couples the AC electric machine (2) with the internal combustion engine (3), for starting the internal combustion engine (3) or for supplying an additional torque in the drivetrain system (1), and/or a second operation mode of the drivetrain system (1), in which the internal combustion engine (3) is running, the clutch (40) couples the internal combustion engine (3) with the AC electric machine (2), the converter (30) causes electric current to flow in alternating fashion from each one of the plurality of windings (W1, W2, W3) to the DC electrical system (6), and the first switch device (20) connects the DC electrical system (6) to the electric battery (B), for charging the electric battery (B). The drivetrain system (1) further comprises a second switch device (50) for connecting at least one of the windings (W1, W2, W3) of the AC electric machine (2) to a heating resistance (R) of an electrically heatable catalyst device (5) in an exhaust passage (4) of the internal combustion engine (3), and disconnecting the at least one of the windings (W1, W2, W3) from the heating resistance (R), respectively. The control device (10) is further designed to provide: a third operation mode of the drivetrain system (1), in which the clutch (40) decouples the AC electric machine (2) from the internal combustion engine (3), the first switch device (20) connects the electric battery (B) to the DC electrical system (6), the converter (30) causes electric current to flow from the DC electrical system (6) to the at least one winding (W1, W2, W3) or in alternating fashion to each one of the plurality of windings (W1, W2, W3), wherein the second switch device (50) connects the respective winding (W1, W2, W3) to the heating resistance (R) of the catalyst device (5), for electrically heating the catalyst device (5), and/or a fourth operation mode of the drivetrain system (1), in which the internal combustion engine (3) is running, the clutch (40) couples the internal combustion engine (3) with the AC electric machine (2), the converter (30) causes electric current to flow in alternating fashion from each one of the plurality of windings (W1, W2, W3) via the second switch device (50) to the heating resistance (R) of the catalyst device (5), wherein the second switch device (50) connects the respective winding (W1, W2, W3) to the heating resistance (R) for electrically heating the catalyst device (5).

BRIEF DESCRIPTION OF THE DRAWINGS

The teachings herein are described by way of an exemplary embodiment with reference to the accompanying drawings, in which.

DETAILED DESCRIPTION

Figure 1:
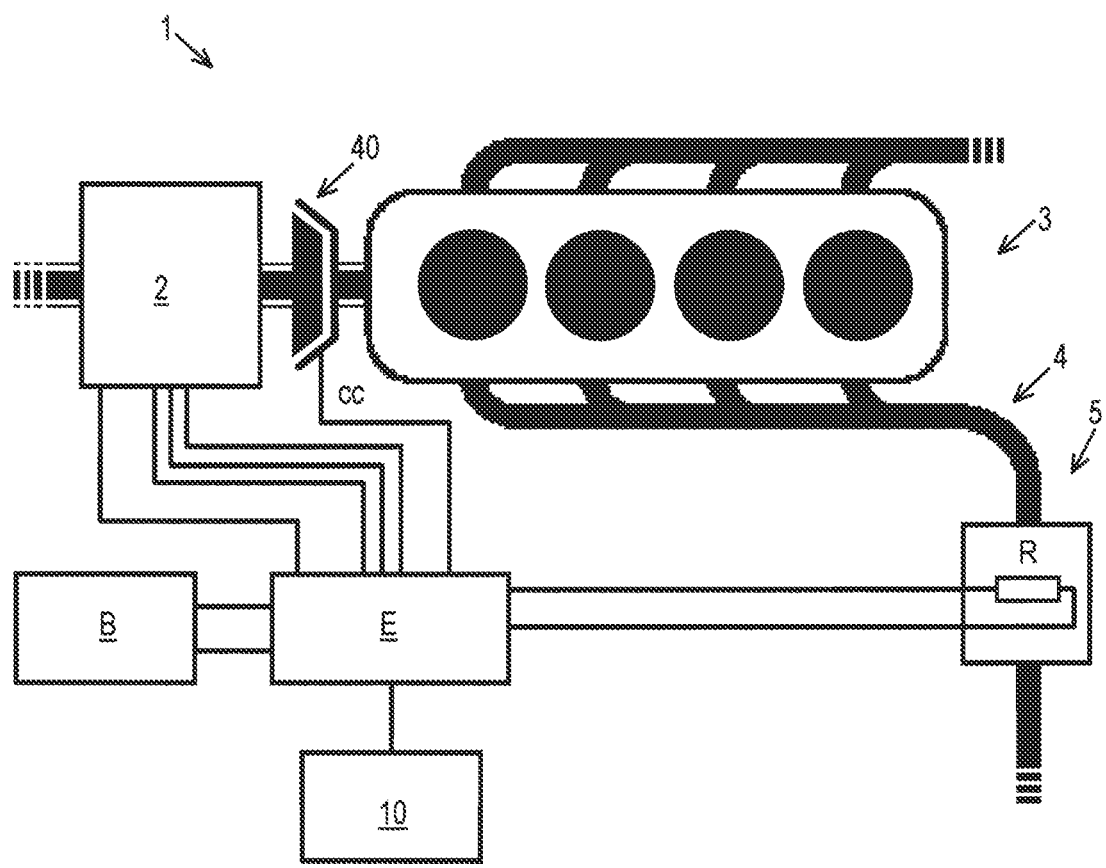
FIG. 1 shows a drivetrain system of a vehicle incorporating teachings of the present disclosure.

The teachings of the present disclosure include a control device wherein:

the components comprise a second switch device for connecting at least one of the windings of the AC electric machine to a heating resistance of an electrically heatable catalyst device in an exhaust passage of the internal combustion engine, and disconnecting the at least one of the windings from the heating resistance, respectively, and the control device is further designed to provide: a third operation mode of the components, in which the clutch decouples the AC electric machine from the internal combustion engine, the first switch device connects the electric battery to the DC electrical system, the converter causes electric current to flow from the DC electrical system to the at least one winding or in alternating fashion to each one of the plurality of windings, wherein the second switch device connects the respective winding to the heating resistance of the catalyst device, for electrically heating the catalyst device; and/or a fourth operation mode of the components, in which the internal combustion engine is running, the clutch couples the internal combustion engine with the AC electric machine, the converter causes electric current to flow in alternating fashion from each one of the plurality of windings via the second switch device to the heating resistance of the catalyst device, wherein the second switch device connects the respective winding to the heating resistance for electrically heating the catalyst device.

In some embodiments, an electrical power supply for the heating resistance of the electrically heatable catalyst device can be realized without remarkably increasing the cost, weight and installation space. The systems described herein may use components that are available anyway in order to accomplish the electrical power supply for the heating resistance from the electric battery ("third operation mode") and/or from the AC electric machine coupled to the running internal combustion engine ("fourth operation mode"). In some embodiments, in particular the existing windings inside the electric machine are used to accomplish the functionality of a DC/DC converter for supplying electric energy to the heating resistance of the catalyst device.

In some embodiments, the converter comprises a plurality of half-bridges, each of the half-bridges electrically powered by the DC electrical system and formed by a series connection of two controllable semiconductor switches, wherein the control device is designed to effect a PWM control of the half-bridges in the first operation mode and the third operation mode, so that a respective output voltage for driving the respective electric current is provided at a circuit node between the two semiconductor switches, wherein the PWM control for each of the half-bridges is effected by a complementary switching on and off of the two respective semiconductor switches.

In some embodiments, the electric machine is a three-phase AC electric machine comprising three corresponding windings (e.g. stator windings), and the converter correspondingly comprises three half-bridges arranged in parallel to one another, wherein each of the half-bridges is electrically powered by a DC voltage provided by the DC electrical system and each of the half-bridges has a circuit node (between the two semiconductor switches), which is electrically connected with a respective one of the three windings.

In some embodiments, the DC voltage provided by the DC electrical system is at least 12V and/or at the most 48V (e.g. 12V, 24V or 48V).

In some embodiments, in each of the half-bridges, the controllable semiconductor switches are formed by transistors, in particular FETs.

In some embodiments, the windings of the AC electric machine are stator windings, in particular three stator windings, in particular connected in a star configuration.

In some embodiments, the windings are connected in a star configuration, meaning that each of the windings has a first terminal electrically connected to a common point (star point).

In some embodiments, the windings of the AC electric machine are connected in a star configuration, in which the star point (neutral point) is electrically connected with a first terminal of a switch of the second switch device, wherein a second terminal of that switch is electrically connected with a first terminal of the heating resistance. In these embodiments, the second terminals of the windings each can be electrically supplied by a respective one of the plurality of output voltages of the converter. To this end, when using a converter comprising a plurality (e.g. three) half-bridges arranged in parallel as mentioned above, the second terminals of the windings each can be electrically connected to a circuit node of the respective half-bridge.

In the following, the two electrical potentials creating the DC voltage provided by the DC electrical system (and corresponding to the battery voltage) are called "ground potential" and "supply potential". As to the first switch device, one pole of the electric battery may be permanently connected to a corresponding pole (e.g. "ground potential") of the DC electrical system, whereas the other pole of the battery can be connected/disconnected from/to the corresponding other pole (e.g. "supply potential") of the DC electrical system by means of the first switch device. In this case, it is sufficient when the first switch device has only one switch for connecting/disconnecting the "supply potential" (e.g. positive pole of the battery) to/from the respective pole of the DC electrical system.

In some embodiments, the drivetrain system of the vehicle is a hybrid drivetrain system comprising the internal combustion engine and the AC electric machine, meaning that the vehicle is a hybrid vehicle and that both mentioned components can contribute to energy supply, e.g. torque supply in the drivetrain, for driving the vehicle.

In some embodiments, the vehicle is a hybrid vehicle, in particular a hybrid vehicle, in which a maximum power that can be supplied by the internal combustion engine is larger by a factor of at least 5, in particular at least 10, than a maximum power that can be supplied by the multi-phase AC electric machine.

In some embodiments, a capacitor is arranged at an electric path between the second switch device and the heating resistance of the catalyst device, in order to buffer a voltage applied at the heating resistance in the third operation mode and the fourth operation mode.

In some embodiments, this electric path is connecting the above mentioned second terminal of the switch of the second switch device with the first terminal of the heating resistance. In this case, the converter, the windings of the multi-phase AC electric machine, the second switch device, and the capacitor can implement the function of a "buck converter" for DC/DC conversion of the DC voltage of the DC electrical system to a heating supply voltage for supplying the heating resistance, which is used in the third operation mode, i.e. for electrically heating the catalyst device from the electric battery.

In some embodiments, the control device can be implemented as a software-controlled device (e.g. microcontroller), designed to accomplish the control used in the invention, or can be implemented as a functional part of such a software-controlled device (e.g. a vehicle's ECU for fulfilling also other functions)

As another example, some embodiments include a method for controlling components of a drivetrain system of a vehicle. In some embodiments, the components further comprise a second switch device for connecting at least one of the windings of the AC electric machine to a heating resistance of an electrically heatable catalyst device in an exhaust passage of the internal combustion engine, and disconnecting the at least one of the windings from the heating resistance, respectively, and the controlling method is further designed to provide:
a third operation mode of the components, in which the clutch decouples the AC electric machine from the internal combustion engine, the first switch device connects the electric battery to the DC electrical system, the converter causes electric current to flow from the DC electrical system to the at least one winding or in alternating fashion to each one of the plurality of windings, wherein the second switch device connects the respective winding to the heating resistance of the catalyst device, for electrically heating the catalyst device, and/or a fourth operation mode of the components, in which the internal combustion engine is running, the clutch couples the internal combustion engine with the AC electric machine, the converter causes electric current to flow in alternating fashion from each one of the plurality of windings via the second switch device to the heating resistance of the catalyst device, wherein the second switch device connects the respective winding to the heating resistance for electrically heating the catalyst device.

The embodiments and specific details described here for the control device can be provided, in an analogous manner, individually or in any combination, as embodiments or specific details of the controlling method according to the invention, and vice versa.

In some embodiments, when the first operation mode of the components for starting the internal combustion engine or supplying an additional torque is provided and thusly the first switch device connects the electric battery to the DC electrical system and the clutch couples the AC electric machine with the internal combustion engine, the converter causes electric current to flow from the DC electrical system in PWM fashion alternating to each one of the plurality of windings.

In some embodiments, when the second operation mode of the components (for charging the electric battery by recuperation using the AC electric machine) is provided and thusly the internal combustion engine is running and the clutch couples the internal combustion engine with the AC electric machine and the first switch device connects the DC electrical system to the electric battery, the converter causes electric current to flow in synchronisation with the rotation of the AC electric machine alternating from each one of the plurality of windings to the DC electrical system.

In some embodiments, in the third operation mode for electrically heating the catalyst device from the electric battery the converter causes the electric current to flow from the DC electrical system in PWM fashion to the at least one winding or in PWM fashion to each one of the plurality of windings, respectively.

In some embodiments, the converter causes the electric current to flow from the DC electrical system in PWM fashion alternating to each one of the plurality of windings. When the converter comprises a plurality of half-bridges, each of the half-bridges electrically powered by the DC electrical system and formed by a series connection of two controllable semiconductor switches (e.g. transistors), in the following also referred to as "high-side switch" (connected to a supply potential of the DC system) and "low-side switch" (connected to a ground potential of the DC system), respectively, in the third operation mode the method can provide a PWM control of the half-bridges by a complementary switching on and off of the respective high-side and low-side switches.

In this way, the converter, the windings of the AC electric machine and the second switching device (and optional the capacitor) can advantageously operate as a converter for supplying energy from the electrical battery to the EHC (electrically heated catalyst). In this case, one or more of the high-side switches (e.g. high-side transistors) each can be used for supplying a PWM voltage to the respective winding and therefore supplying an electric current flowing via the second switch device to the heating resistance of the EHC, wherein the corresponding low-side switches (e.g. low-side transistors) can be used for re-circulating the electric current ("simulating" a diode in a conventional buck DC/DC converter).

In some embodiments, all phases (e.g. three phases) are alternatingly used in this way, such that the operation of each phase is shifted such that during a full switching cycle all phases are operated with equal durations. In this case, all high-side switches mentioned above can be used (one after another) for supplying a voltage (supply voltage of the electrical DC system) and thusly an electric current flowing through the respective winding and through the second switch device to the heating resistance. Each time one of the high-side switches is switched off, the respective low-side switch is switched on, such that the the electric current can re-circulate (to the ground potential of the electrical DC system).

In some embodiments, in the third operation mode, a variable voltage down-conversion can be achieved, for example, by a suitable variation of a PWM duty cycle (e.g. defined as the ratio between a PWM "ON"-time and a PWM period duration of the corresponding PWM signal).

In some embodiments, in the fourth operation mode, the first switch device disconnects the electric battery from the DC electrical system. In this case, electrical power from the AC electric machine coupled to the running internal combustion engine in the fourth operation mode is only supplied to the heating resistance.

In some embodiments, when in the fourth operation mode the first switch device connects the electric battery to the DC electrical system, electrical power from the AC electric machine in the fourth operation mode can be additionally supplied to the electric battery.

In some embodiments, in the fourth operation mode, a variable power supplied to the EHC can be achieved, for example, by a suitable variation of a time dependent switching ON and OFF of the second switch device and/or variation of a time dependent control of the converter.

As another example, some embodiments include a drivetrain system for a vehicle, comprising:

a first switch device for connecting an electric battery of the vehicle to a DC electrical system of the vehicle, and disconnecting the electric battery from the DC electrical system, respectively, a bidirectional converter for enabling electric current to flow from the DC electrical system in alternating fashion, for example in PWM fashion, to each one of a plurality of windings of a multi-phase AC electric machine of the vehicle, for driving the AC electric machine, and enabling electric current to flow in alternating fashion from each one of the plurality of windings to the DC electrical system, for recovering electric energy from the AC electric machine, respectively, a clutch for coupling the AC electric machine with an internal combustion engine of the vehicle, and decoupling the AC electric machine from the internal combustion engine, respectively, and a control device for controlling the first switch device, the converter and the clutch, wherein the control device is designed to provide a first operation mode of the drivetrain system, in which the first switch device connects the electric battery to the DC electrical system, the converter causes electric current to flow from the DC electrical system in alternating fashion to each one of the plurality of windings, and the clutch couples the AC electric machine with the internal combustion engine, for starting the internal combustion engine or for supplying an additional torque in the drivetrain system, and/or a second operation mode of the drivetrain system, in which the internal combustion engine is running, the clutch couples the internal combustion engine with the AC electric machine, the converter causes electric current to flow in alternating fashion from each one of the plurality of windings to the DC electrical system, and the first switch device connects the DC electrical system to the electric battery, for charging the electric battery, characterized in that the drivetrain system further comprises a second switch device for connecting at least one of the windings of the AC electric machine to a heating resistance of an electrically heatable catalyst device in an exhaust passage of the internal combustion engine, and disconnecting the at least one of the windings from the heating resistance, respectively, and in that the control device is further designed to provide a third operation mode of the drivetrain system, in which the clutch decouples the AC electric machine from the internal combustion engine, the first switch device connects the electric battery to the DC electrical system, the converter causes electric current to flow from the DC electrical system to the at least one winding or in alternating fashion to each one of the plurality of windings, wherein the second switch device connects the respective winding to the heating resistance of the catalyst device, for electrically heating the catalyst device, and/or a fourth operation mode of the drivetrain system, in which the internal combustion engine is running, the clutch couples the internal combustion engine with the AC electric machine, the converter causes electric current to flow in alternating fashion from each one of the plurality of windings via the second switch device to the heating resistance of the catalyst device, wherein the second switch device connects the respective winding to the heating resistance for electrically heating the catalyst device.

The embodiments and specific details described here for the control device and/or the controlling method incorporating teachings of the present disclosure can be provided, individually or in any combination, also for the drivetrain systems described herein.

FIG. 1 shows a hybrid drivetrain system 1 of a vehicle, comprising an AC electric machine 2 and an internal combustion engine 3. In the shown example, the AC electric machine 2 is a three-phase AC electric machine. The drivetrain system 1 further comprises a clutch 40 for coupling the AC electric machine 2 with the internal combustion engine 3 and for decoupling the AC electric machine 2 from the internal combustion engine 3, such that the AC electric machine 2 and the internal combustion engine 3 both can be operated to contribute to a driving torque for driving the vehicle.

The clutch 40 is controlled by means of a corresponding clutch control signal "cc", which is generated by a control device 10 and transmitted through an electric system "E" (electric circuit arrangement) to the clutch 40. Further, the drivetrain system 1 comprises a rechargeable electric battery "B" coupled to the electric system E, such that electric power can be transferred between the electric battery B and the AC electric machine 2 (in FIG. 1 through the electric system E).

The system shown in FIG. 1 further comprises an electrically heatable catalyst (EHC) device 5 arranged in an exhaust passage 4 of the internal combustion engine 3. The catalyst device 5 comprises a heating resistance R, so that an electrical power for heating the catalyst device 5 can be provided by an electric current flowing through the resistance R. The catalyst device 5 is coupled to the electric system E, such that an electric power can be transferred from the electric system E to the resistance R for heating the catalyst device 5.

Figure 2:
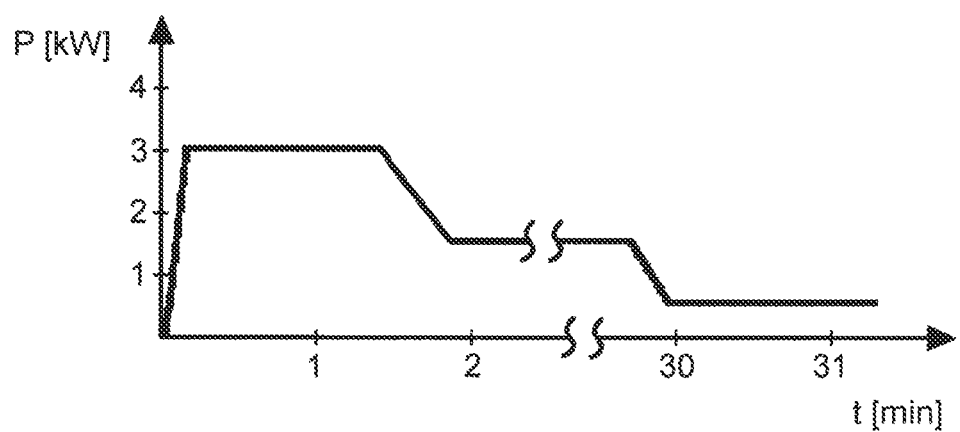
FIG. 2 is a diagram showing an electrical power required to heat an electrically heated catalyst (EHC) dependent on time.

FIG. 2 shows an example of the electrical power P used to heat an EHC, for example the the catalyst device 5 in FIG. 1, dependent on time t. In this example, the electrical power P is raised up to a maximum value of approx. 3 kW right after starting the internal combustion engine 3. About 2 min later, the electrical power P is reduced to a medium value, and about 30 min later reduced to a minimum value of approx. 0.5 kW.

Starting from an arrangement in a vehicle having a hybrid drivetrain as simplified presented in FIG. 1, the teachings of the present disclosure may include an electric system E in connection with the control device 10 to provide an electrical power supply for the heating resistance R of the catalyst device, wherein problems of prior art solutions are avoided.

Figure 3:
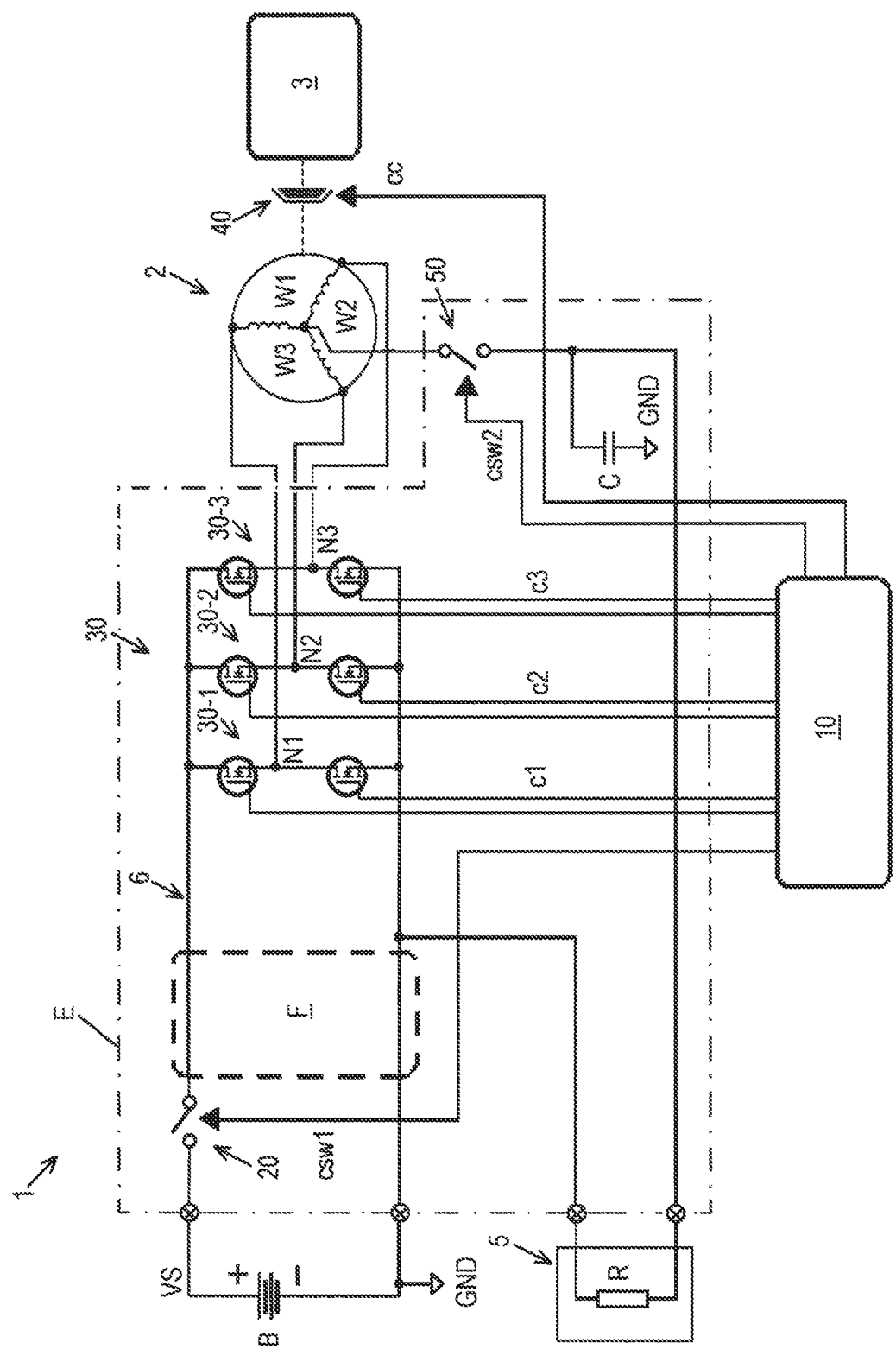
FIG. 3 shows more detailed a drivetrain system of a vehicle incorporating teachings of the present disclosure.

FIG. 3 shows more detailed the drivetrain system 1 of FIG. 1. In the example of the drivetrain system 1 shown in FIG. 3, the three-phase AC electric machine 2 has three stator windings W1, W2, W3 corresponding to the three phases of an AC driving of the electric machine 2 and arranged in star configuration, i.e. each of the windings W1, W2, W3 has a first terminal electrically connected to a common point ("star point"), whereas second terminals of the windings W1, W2, W3 are not connected to one another but individually with output nodes N1, N2, N3 of a converter 30 arranged in the electric system E. For the sake of simplicity, the rotor of the AC electric machine 2 is omitted in FIG. 3.

The converter 30 comprises three half-bridges 30-1, 30-2, 30-3, each of which is electrically powered by a supply voltage of a DC electrical system 6 ("electrical onboard network") between a ground potential "GND" and a supply potential "VS". Each of the half-bridges 30-1, 30-2, 30-3 is formed as a series connection of two transistors (generally: controllable semiconductor switches) as shown in FIG. 3, in the following also referred to as "high-side switch" connected to the supply potential VS and "low-side switch" connected to the ground potential GND, respectively.

The control device 10 is designed to enable and in case of particular operation modes of the drivetrain system 1 actually effect a complementary switching control of the half-bridges 30-1, 30-2, 30-3, meaning that the control device 10 generates converter control signals c1, c2, c3 transmitted (through the electric system E) to the respective half-bridges 30-1, 30-2, 30-3 such that in each of the half-bridges 30-1, 30-2, 30-3 the low-side switch is on and the corresponding high-side switch is off, or vice versa.

Therefore, each of the output potentials provided at the circuit nodes N1, N2, N3 of the half-bridges 30-1, 30-2, 30-3 can be switched between the ground potential GND and the supply potential VS, dependent on the corresponding converter control signal c1, c2, and c3, respectively. Therefore, by means of the control device 10, the respective output voltages provided at the circuit nodes N1, N2, N3 (related to the ground potential GND) can be switched between zero (ground potential GND) and the supply voltage (VS).

The rechargeable electric battery B can be formed for example by a lithium-ion accumulator and in the shown example provides a battery voltage of 48V between the ground potential GND (negative potential of the battery B) and the supply potential VS (positive potential of the battery).

The electric system E of the drivetrain system 1 further comprises a first switch device 20 by which the electric battery B can be connected to the DC electrical system 6 of the vehicle, and by which the electric battery B can be disconnected from the DC electrical system 6. The DC electrical system 6 constitutes an electrical onboard network for power supply of electrical consumers of the vehicle. In the shown example, the DC electrical system 6 is such an electrical onboard network for power supply of 48V consumers.

Optionally, as shown in FIG. 3 in dashed lines, the DC electrical system 6 can be equipped with a filter circuit F for reducing electrical disturbances in the electric overall system.

The first switch device 20 is formed by a controllable switch for connecting/disconnecting a terminal (pole) providing the supply potential VS (positive potential) of the battery B to/from the electrical line providing the supply potential VS of the DC electrical system 6, whereas the ground potential GND (negative potential) of the battery B is permanently connected to an electrical line providing the ground potential GND of the DC electrical system 6.

The first switch device 20 is controlled by means of a corresponding first switch control signal "csw1", which is generated by the control device 10 and transmitted (through the electric system E) to the first switch device 20.

The drivetrain system 1 further comprises the above already mentioned converter 30, which is supplied by the supply voltage (e.g. 48V) of the DC electrical system 6 and which enables an electric current to flow from the DC electrical system 6 in alternating fashion, for example in PWM fashion, to each one of the plurality of windings W1, W2, W3 of the three-phase AC electric machine 2, for operating/driving the AC electric machine 2. The converter 30 further enables an electric current to flow in alternating fashion from each one of the windings W1, W2, W3 to the DC electrical system 6, for recovering electric energy from the AC electric machine 2.

In some embodiments, the control device 10 can be implemented for example as a software controlled device (e.g. microcontoller etc.) or as a functional part of a software controlled device used to accomplish additional functions in the vehicle (e.g. a vehicle's central ECU). In some embodiments, the control device 10 serves in particular for controlling the first switch device 20 (by means of the signal csw1), the converter 30 (by means of the signals c1, c2, c3) and the clutch 40 (by means of the signal cc), wherein the control device 10 is designed to implement, according to respective current requirements, an operation of the drivetrain system 1 according to a plurality of different "operation modes".

A first operation mode of the drivetrain system 1 can be initiated by the control device 10. This operation mode serves for starting the internal combustion engine 3 (in case that previously the internal combustion engine 3 was turned off) or supplying an additional torque (by means of the electric machine 2) in the drivetrain system (in case that the internal combustion engine 3 is already running), wherein electric energy from the electric battery B is used.

In the first operation mode, the first switch device 20 connects the electric battery B to the DC electrical system 6, the converter 30 causes electric current to flow from the DC electrical system 6 in alternating fashion to each one of the plurality of windings W1, W2, W3 (e.g. PWM control), and the clutch 40 couples the AC electric machine 2 with the internal combustion engine 3.

In the first operation mode, the control device 10 effects a PWM control of the half-bridges 30-1, 30-2, 30-3, so that the respective output voltages for driving the electric currents are provided at the circuit nodes N1, N2, N3, wherein the PWM control for each of the half-bridges 30-1, 30-2, 30-3 is effected by a complementary switching on and off of the two respective high-side and low-side switches.

A second operation mode of the drivetrain system 1 can be initiated by the control device 10. This operation mode serves for charging the electric battery B, wherein electric energy generated by the electric machine 2 in a "recuperation mode" is used.

In the second operation mode, the internal combustion engine 3 is running, the clutch 40 couples the internal combustion engine 3 with the AC electric machine 2, the converter 30 causes electric current to flow in alternating fashion from each one of the plurality of windings W1, W2, W3 to the DC electrical system 6, and the first switch device 20 connects the DC electrical system 6 to the electric battery B.

For example, in these operation modes, the control device 10 or a device (e.g. vehicle's ECU) implementing the control device 10 can take into account measured momentary values of rotational position and/or rotational speed of the rotor of the AC electric machine 2 and/or electric current flowing through the windings W1, W2, W3. A peculiar feature of the drivetrain system 1 according to the example of FIG. 3, however, is a second switch device 50 for (at least intermittently) connecting the star point of the windings W1, W2, W3 of the AC electric machine 2 to a first terminal of the heating resistance R of the catalyst device 5, and disconnecting the star point from the heating resistance R, respectively. To this end, in the shown example, the second switch device 50 is formed by a switch having a first terminal connected to the star point and a second terminal connected to the first terminal of the heating resistance R. As shown in FIG. 3, a second terminal of the heating resistance R is permanently connected to the ground potential GND.

The second switch device 50 is controlled by means of a corresponding second switch control signal "csw2", which is generated by the control device 10 and transmitted (through the electric system E) to the second switch device 50.

Another peculiar feature of this drivetrain system 1 is that the control device 10 is further designed to implement, according to respective current requirements, an operation of the drivetrain system 1 according to at least one of the third and fourth operation modes described below. In this respect, the control device 10 further serves in particular for controlling the second switch device 50 by means of the above-mentioned signal csw2.

A third operation mode of the drivetrain system 1 can be initiated by the control device 10. This operation mode serves for electrically heating the catalyst device 5, wherein electric energy from the electric battery B is used. In the third operation mode, the clutch 50 decouples the AC electric machine 2 from the internal combustion engine 3, the first switch device 20 connects the electric battery B to the DC electrical system 6, the converter 30 causes electric current to flow from the DC electrical system 6 in alternating fashion to each one of the plurality of windings W1, W2, W3, wherein the second switch device 50 is used to (at least intermittently) connect the respective winding W1, W2, W3 (in the shown example via the star point of the winding arrangement) to the first terminal of the heating resistance R of the catalyst device 5 (whereas the second terminal of the heating resistance R is permanently connected to the ground potential GND).

In the electric system E of the drivetrain system 1, a capacitor C is arranged at an electrical line between the second terminal of the switch of the second switch device 50 and the first terminal of the heating resistance R of the catalyst device 5, in order to buffer a voltage applied at the heating resistance R in the third operation mode (as well as in the fourth operation mode explained below).

In the third operation mode, the electrical circuit comprising the converter 30, the electric machine 2, the second switch device 50 and the capacitor C can operate like a (conventional) multi-phase buck converter to supply energy to the catalyst device 5. The high-side switches can be used for supplying a PWM voltage (VS) for a certain time ("ON"-time in PWM voltage) to the corresponding one of the windings W1, W2, W3, and the low-side switches can be used for re-circulating the corresponding electrical current (simulating the diode in a conventional Buck converter). In the shown example, the switch of the second switch device 50 is turned on (closed) for the whole duration of the third operation mode.

In the shown example, in the third operation mode, all of the plurality of phases (of the electric machine 2) and thusly all of the plurality of windings (W1, W2, W3) are alternatingly used. This is illustrated in FIG. 4.

Figure 4:
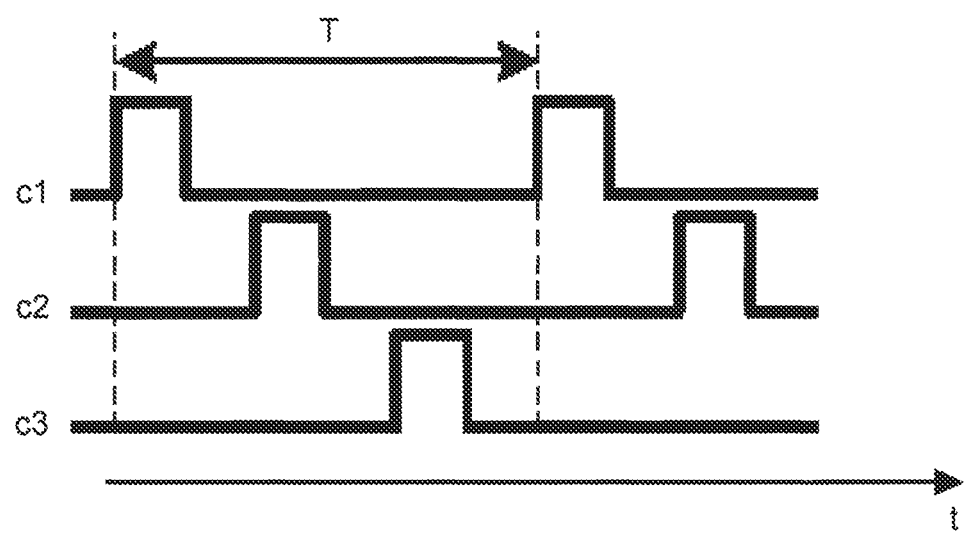
FIG. 4 is a diagram showing control signals dependent on time, for implementing an operation mode of a drivetrain system for electrically heating the catalyst device.

FIG. 4 shows the converter control signals c1, c2, c3 dependent on time t, when the third operation mode is activated. In FIG. 4 it is assumed that a high ("1") level of the signal c1 means that the corresponding high-side switch (of the half-bridge 30-1) is on and the corresponding low-side switch (of the half-bridge 30-1) is off, whereas a low ("0") level of the signal c1 means that the corresponding high-side switch is off and the corresponding low-side switch is on. Analogously, the same applies for the signals c2 (for the half-bridge 30-2) and c3 (for the half-bridge 30-3) in the shown example.

As can be seen from FIG. 4, in the shown example, all of the plurality (three) of windings (W1, W2, W3) are used cyclically within a period time T, which can be chosen corresponding to a PWM frequency (1/T) for example in the range of some kHz. In the shown example, the respective "ON"-times of the signals c1, c2, c3 are chosen to be equal. For example, when the signal c1 has the high ("1") level ("ON"-time of PWM), an electrical current flows from the positive terminal (pole) of the electric battery B, via the switch of the first switch device 20, the high-side switch of the bridge 30-1, the winding W1, the switch of the second switch device 50 and the heating resistance R to the negative terminal (pole) of the electric battery B. Due to the inductivity provided by the winding W1, this electrical current is growing during the duration of that "ON"-time.

Then, when the signal c1 has changed to the low ("0") level ("OFF"-time of PWM of c1), the electrical current is re-circulated, i.e. flows from the first terminal of the winding W1 via the switch of the second switch device 50, the heating resistance R, the low-side switch of the bridge 30-1 and the node N1 to the second terminal of the winding W1. Due to the dissipation of energy in the resistance R, the electrical current is sinking during the duration of that "OFF"-time. Analogously, the same applies for the "ON"- and "OFF"-times of the signals c2 (with current flowing through the winding W2) and c3 (with current flowing through the winding W2). In some embodiments, a variable voltage down-conversion can be achieved e.g. by a corresponding variation of the PWM duty cycle (e.g. defined as the ratio between the PWM "ON"-time and a PWM period of the signals c1, c2, c3).

A fourth operation mode of the drivetrain system 1 can be initiated by the control device 10. This operation mode serves for electrically heating the catalyst device 5, wherein electric energy generated by the electric machine 2 in a "recuperation mode" is used. In the fourth operation mode, the internal combustion engine 3 is running, the clutch 40 couples the internal combustion engine 3 with the AC electric machine 2, the converter 30 causes electric current to flow in alternating fashion from each one of the plurality of windings W1, W2, W3 via the second switch device 50 to the heating resistance R of the catalyst device 5, wherein the second switch device 50 (at least intermittently) connects the respective winding (via the star point of the winding arrangement) to the first terminal of the heating resistance R of the catalyst device 5 (whereas the second terminal of the heating resistance R is permanently connected to the ground potential GND).

Besides, in the above mentioned first and second operating modes, the second switch device 50 is permanently turned off, i.e. the switch disconnects the windings W1, W2, W3 (here: the star point) from the electrical line leading to the first terminal of the heating resistance R. In the fourth operation mode, similar as in the third operation mode, the electrical circuit comprising the converter 30, the electric machine 2, the second switch device 50 and the capacitor C can also operate like a multi-phase buck converter to supply energy to the catalyst device 5. In the fourth operation mode, however, the electric energy is transferred not from the electric battery B, but from the windings of the AC electric machine 2 which is coupled to and driven by the internal combustion engine 3 (recuperation mode).

To this end, in the shown embodiment, the switch of the second switch device 50 is turned on (closed) for the whole duration of the fourth operation mode, but the low-side switches of the converter 30 are operated alternatingly and synchronized with the rotation of the electric machine 2, such that a voltage generated in each of the windings W1, W2, W3 is applied to the heating resistance R of the catalyst device 5.

In some embodiments, also in the fourth operation mode all of the plurality (three) of windings (W1, W2, W3) are used cyclically within a period time, wherein in the fourth operation mode this period time depends on the momentary rotational speed of the electric machine 2 to accomplish the above mentioned synchronisation. To this end, the control device 10 can take into account e.g. measured momentary values of the rotational position of the rotor of the AC electric machine 2.

In some embodiments, in the fourth operation mode, despite from the determination of an available electric power provided by the AC electric machine 2, a variation of the power actually supplied to the EHC can be achieved within the framework of the invention by a suitable variation of the time dependent control of the converter. In some embodiments, also a time dependent switching ON and OFF of the second switch device (and e.g. a variation thereof) can be foreseen to this end.

In summary, an example embodiment of the teachings herein includes a control device (10) for controlling components (20, 30, 40, 50) of a drivetrain system (1) of a vehicle, said components (20, 30, 40, 50) comprising a first switch device (20) for connecting/disconnecting an electric battery (B) with a DC electrical system (6); a converter (30) for enabling electric current to flow from the system (6) to each one of windings (W1, W2, W3) of a multi-phase AC electric machine (2), for driving the electric machine (2), and enabling electric current to flow from each one of the windings (W1, W2, W3) to the system (6), for recovering electric energy from the electric machine (2), respectively; a clutch (40) for coupling/decoupling the electric machine (2) with an internal combustion engine (3). The control device (10) provides a first operation mode, in which the first switch device (20) connects the electric battery (B) to the system (6), the converter (30) causes current to flow from the system (6) to each one of the windings (W1, W2, W3), and the clutch (40) couples the electric machine (2) with the engine (3), e.g. for starting the engine (3), and/or a second operation mode, in which the engine (3) is running, the clutch (40) couples the engine (3) with the electric machine (2), the converter (30) causes current to flow from each one of the windings (W1, W2, W3) to the system (6), and the first switch device (20) connects the system (6) to the electric battery (B), for charging the electric battery (B). According to the invention, the components (20, 30, 40, 50) further comprise a second switch device (50) for connecting/disconnecting at least one of the windings (W1, W2, W3) of the electric machine (2) with a heating resistance (R) of an electrically heatable catalyst device (5) of the engine (3), wherein the control device (10) further provides a third operation mode, in which the clutch (40) decouples the electric machine (2) from the engine (3), the first switch device (20) connects the electric battery (B) to the system (6), the converter (30) causes current to flow from the system (6) to the at least one winding (W1, W2, W3) and the second switch device (50) connects the respective winding (W1, W2, W3) to the heating resistance (R), for electrically heating the catalyst device (5), and/or a fourth operation mode, in which the engine (3) is running, the clutch (40) couples the engine (3) with the electric machine (2), the converter (30) causes current to flow from each of the windings (W1, W2, W3) via the second switch device (50) to the heating resistance (R) and the second switch device (50) connects the respective winding (W1, W2, W3) to the heating resistance (R) for electrically heating the catalyst device (5).

LIST OF REFERENCE SIGNS 1 drivetrain system
2 AC electric machine
W1, W2, W3 stator windings
3 internal combustion engine
B electric battery
4 exhaust passage
5 electrically heatable catalyst device
R heating resistance
P electrical power
t time
E electric system (circuit arrangement)
6 DC electrical system (electrical onboard network)
F filter circuit
VS supply potential
GND ground potential
10 control device
20 first switch device
csw1 first switch control signal
30 converter
30-1, 30-2, 30-3 half-bridges
c1, c2, c3 converter control signals
40 clutch
cc clutch control signal
50 second switch device
csw2 second switch control signal
T period time (in third operation mode)
C capacitor

The invention claimed is:

1. A control device for controlling a drivetrain system of a vehicle, the drivetrain comprising a first switch device for connecting an electric battery to a DC electrical system, a bidirectional converter for enabling electric current to flow from the DC electrical system in alternating fashion, and a clutch for coupling an AC electric machine with an internal combustion engine of the vehicle, and a second switch device for connecting at least one of a plurality of windings of the AC electric machine to a heating resistance of an electrically heatable catalyst device in an exhaust passage of the internal combustion engine, the control device comprising:

a memory storing a set of instructions; and
a processor coupled to the memory;
wherein the set of instructions, when accessed and executed by the processor causes the drivetrain system to enter a respective operation mode selected by the processor;
wherein a first operation mode includes: the first switch device connects the electric battery to the DC electrical system, the converter causes electric current to flow from the DC electrical system in alternating fashion to each one of a plurality of windings, and the clutch couples the AC electric machine with the internal combustion engine for starting the internal combustion engine or for supplying an additional torque in the drivetrain system; and/or
a second operation mode includes: the internal combustion engine is running, the clutch couples the internal combustion engine with the AC electric machine, the converter causes electric current to flow in alternating fashion from each one of the plurality of windings to the DC electrical system, and the first switch device connects the DC electrical system to the electric battery for charging the electric battery;
a third operation mode includes: the clutch decouples the AC electric machine from the internal combustion engine, the first switch device connects the electric battery to the DC electrical system, the converter causes electric current to flow from the DC electrical system to the at least one winding or in alternating fashion to each one of the plurality of windings, wherein the second switch device connects the respective winding to the heating resistance of the catalyst device, for electrically heating the catalyst device; and
a fourth operation mode includes: the internal combustion engine is running, the clutch couples the internal combustion engine with the AC electric machine, the converter causes electric current to flow in alternating fashion from each one of the plurality of windings via the second switch device to the heating resistance of the catalyst device, and the second switch device connects the respective winding to the heating resistance for electrically heating the catalyst device.

2. The control device according to claim 1, wherein the converter comprises a plurality of half-bridges electrically powered by the DC electrical system;

wherein each half-bridge comprises a series connection of two controllable semiconductor switches;

the control device controls the respective half-bridges using a PWM control in the first operation mode and the third operation mode, so that a respective output voltage for driving the respective electric current is provided at a circuit node between the two semiconductor switches;

wherein the PWM control for each of the half-bridges includes a complementary switching on and off of the two respective semiconductor switches.

3. The control device according to claim 1, wherein the windings of the AC electric machine are stator windings.

4. The control device according to claim 1, wherein the drivetrain system of the vehicle comprises the internal combustion engine and the AC electric machine.

5. The control device according to claim 1, further comprising a capacitor arranged at an electric path between the second switch device and the heating resistance of the catalyst device to buffer a voltage applied at the heating resistance in the third operation mode and the fourth operation mode.

6. A method for controlling a drivetrain system of a vehicle comprising a first switch device for connecting an electric battery to a DC electrical system, a bidirectional converter for enabling electric current to flow from the DC electrical system in alternating fashion to each one of a plurality of windings of a multi-phase AC electric machine for driving the AC electric machine, and enabling electric current to flow in alternating fashion from each one of the plurality of windings to the DC electrical system for recovering electric energy from the AC electric machine, a clutch for coupling the AC electric machine to an internal combustion engine, and a second switch device for connecting at least one of the windings to a heating resistance of an electrically heatable catalyst device in an exhaust passage of the internal combustion engine, the method comprising:

operating the drivetrain system in a first operation mode wherein the first switch device connects the electric battery to the DC electrical system, the converter causes electric current to flow from the DC electrical system in alternating fashion to each one of the plurality of windings, and the clutch couples the AC electric machine with the internal combustion engine for starting the internal combustion engine or for supplying an additional torque in the drivetrain system;

operating the drivetrain system in a second operation mode wherein the internal combustion engine is running, the clutch couples the internal combustion engine with the AC electric machine, the converter causes electric current to flow in alternating fashion from each one of the plurality of windings to the DC electrical system, and the first switch device connects the DC electrical system to the electric battery for charging the electric battery;

operating the drivetrain system in a third operation mode wherein the clutch decouples the AC electric machine from the internal combustion engine, the first switch device connects the electric battery to the DC electrical system, the converter causes electric current to flow from the DC electrical system to the at least one winding or in alternating fashion to each one of the plurality of windings, wherein the second switch device connects the respective winding to the heating resistance of the catalyst device for electrically heating the catalyst device; and operating the drivetrain system in a fourth operation mode wherein the internal combustion engine is running, the clutch couples the internal combustion engine with the AC electric machine, the converter causes electric current to flow in alternating fashion from each one of the plurality of windings via the second switch device to the heating resistance of the catalyst device for electrically heating the catalyst device.

7. The method according to claim 6, wherein, in the third operation mode, the converter causes the electric current to flow from the DC electrical system in PWM fashion to the at least one winding.

8. The method according to claim 1, wherein in the fourth operation mode, the first switch device disconnects the electric battery from the DC electrical system.

9. A drivetrain system for a vehicle, the drivetrain comprising:

a first switch device for connecting an electric battery of the vehicle to a DC electrical system of the vehicle and disconnecting the electric battery from the DC electrical system;

a bidirectional converter for enabling electric current to flow from the DC electrical system in alternating fashion to each one of a plurality of windings of a multi-phase AC electric machine of the vehicle for driving the AC electric machine and enabling electric current to flow in alternating fashion from each one of the plurality of windings to the DC electrical system for recovering electric energy from the AC electric machine;

a clutch for coupling the AC electric machine with an internal combustion engine of the vehicle;

a second switch device for connecting at least one of the windings of the AC electric machine to a heating resistance of an electrically heatable catalyst device in an exhaust passage of the internal combustion engine; and a control device for controlling the first switch device, the converter, and the clutch, wherein the control device causes the drivetrain to operate in at least one of the operating modes selected from the group consisting of:

a first operation mode wherein the first switch device connects the electric battery to the DC electrical system, the converter causes electric current to flow from the DC electrical system in alternating fashion to each one of the plurality of windings, and the clutch couples the AC electric machine with the internal combustion engine for starting the internal combustion engine or for supplying an additional torque in the drivetrain system;

a second operation mode wherein the internal combustion engine is running, the clutch couples the internal combustion engine with the AC electric machine, the converter causes electric current to flow in alternating fashion from each one of the plurality of windings to the DC electrical system, and the first switch device connects the DC electrical system to the electric battery for charging the electric battery;

a third operation mode wherein the clutch decouples the AC electric machine from the internal combustion engine, the first switch device connects the electric battery to the DC electrical system, the converter causes electric current to flow from the DC electrical system to the at least one winding or in alternating fashion to each one of the plurality of windings, the second switch device connects the respective winding to the heating resistance of the catalyst device for electrically heating the catalyst device; and a fourth operation mode wherein the internal combustion engine is running, the clutch couples the internal combustion engine with the AC electric machine, the converter causes electric current to flow in alternating fashion from each one of the plurality of windings via the second switch device to the heating resistance of the catalyst device, and the second switch device connects the respective winding to the heating resistance for electrically heating the catalyst device.

\* \* \* \* \*